(12) United States Patent
Kim et al.

(10) Patent No.: US 9,857,832 B2
(45) Date of Patent: Jan. 2, 2018

(54) FOLDABLE ELECTRONIC APPARATUS HAVING DISPLAY PANEL WITH VARIABLE CURVATURE

(71) Applicant: SAMSUNG ELECTRONICS CO., LTD., Suwon-si (KR)

(72) Inventors: Dong-churl Kim, Ansan-si (KR); Jin-hyoung Park, Suwon-si (KR); Kyung-wan Park, Suwon-si (KR); Jae-young Huh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/040,056

(22) Filed: Feb. 10, 2016

(65) Prior Publication Data

US 2016/0378203 A1    Dec. 29, 2016

Related U.S. Application Data

(60) Provisional application No. 62/183,435, filed on Jun. 23, 2015.

(30) Foreign Application Priority Data

Aug. 25, 2015    (KR) .......................... 10-2015-0119363

(51) Int. Cl.
*G09G 5/00*    (2006.01)
*G06F 1/16*    (2006.01)

(52) U.S. Cl.
CPC .......... *G06F 1/1616* (2013.01); *G06F 1/1652* (2013.01); *G06F 1/1675* (2013.01);
(Continued)

(58) Field of Classification Search
CPC ...... G06F 1/1652; G06F 1/166; G06F 1/1616; G06F 1/1675; G06F 1/1679; G09G 2380/02
(Continued)

(56) References Cited

U.S. PATENT DOCUMENTS 6,577,496 B1 *   6/2003   Gioscia ................. G06F 1/1616
                                                            345/156
8,228,667 B2 *   7/2012   Ma ........................ G06F 1/1652
                                                            361/679.01
(Continued)

FOREIGN PATENT DOCUMENTS

JP    2007-534055 A    11/2007
JP    2012-142001 A    7/2012
(Continued)

OTHER PUBLICATIONS

International Search Report (PCT/ISA/210) dated Jul. 22, 2016 issued by the International Searching Authority in counterpart International Application No. PCT/KR2016/003472.
(Continued)

*Primary Examiner* — Adam J Snyder
(74) *Attorney, Agent, or Firm* — Sughrue Mion, PLLC

(57) ABSTRACT

A foldable electronic apparatus includes a flexible display panel, a first cover and a second cover configured to support a rear surface of the flexible display panel and be interconnected by a hinge member, and a first slider and a second slider configured to be installed on the first cover and the second cover and vary a curvature of the flexible display panel by an operation of sliding along the first cover and the second cover, respectively.

22 Claims, 23 Drawing Sheets

(52) U.S. Cl.
CPC .... *G06F 1/1679* (2013.01); *G06F 2200/1614* (2013.01); *G09G 2380/02* (2013.01)

(58) Field of Classification Search
USPC .......................................................... 345/1.1
See application file for complete search history.

(56) References Cited

U.S. PATENT DOCUMENTS

| | | |
|---|---|---|
| 2006/0146488 A1 | 7/2006 | Kimmel |
| 2007/0205997 A1 | 9/2007 | Lieshout et al. |
| 2012/0002360 A1* | 1/2012 | Seo ....................... G06F 1/1616 361/679.01 |
| 2012/0162876 A1 | 6/2012 | Kim |
| 2012/0264489 A1* | 10/2012 | Choi ..................... G06F 1/1652 455/566 |
| 2013/0021762 A1* | 1/2013 | van Dijk ............... G06F 1/1652 361/749 |
| 2013/0307816 A1* | 11/2013 | Lee ....................... G06F 1/1652 345/173 |
| 2013/0342094 A1* | 12/2013 | Walters ................. G06F 1/1641 312/319.2 |
| 2014/0029171 A1* | 1/2014 | Lee ....................... G06F 1/1652 361/679.01 |
| 2014/0126133 A1 | 5/2014 | Griffin et al. |
| 2014/0226275 A1 | 8/2014 | Ko et al. |
| 2015/0035812 A1 | 2/2015 | Shin et al. |

FOREIGN PATENT DOCUMENTS

| | | |
|---|---|---|
| JP | 2013-105311 A | 5/2013 |
| KR | 10-2014-0101274 A | 8/2014 |

OTHER PUBLICATIONS

Written Opinion (PCT/ISA/237) dated Jul. 22, 2016 issued by the International Searching Authority in counterpart International Application No. PCT/KR2016/003472.

* cited by examiner

10

610  630  640  620

FOLDABLE ELECTRONIC APPARATUS HAVING DISPLAY PANEL WITH VARIABLE CURVATURE

CROSS-REFERENCE TO RELATED APPLICATIONS

This application claims priority from Korean Patent Application No. 10-2015-0119363, filed on Aug. 25, 2015, in the Korean Intellectual Property Office, and the benefit of U.S. Provisional Application No. 62/183,435, filed on Jun. 23, 2015, in the United States Patent and Trademark Office, the disclosures of which are incorporated herein by reference in their entireties.

BACKGROUND

1. Field

Apparatuses and methods consistent with exemplary embodiments relate to a foldable electronic apparatus, and more particularly, to a foldable electronic apparatus that is capable of varying a curvature of a flexible display panel to a desired curvature.

2. Description of the Related Art

A flexible display panel refers to a display panel that can be bent or curved. The flexible display panel may be realized as a touch screen which may receive a user command, for example, in a form of a touch input (e.g., a capacitive touch input or a pressure-sensitive touch input).

The flexible display panel, which may receive a touch input, may be used in a number of different types of electronic apparatuses, such as a curved Television (TV), a curved mobile phone, and an electronic dictionary, etc.

However, as described above, a flexible display panel is integrated with a body, and thus, can only be used at a predetermined curvature. Therefore, it is difficult to make full use of the flexibility of the flexible display.

Accordingly, a method of freely adjusting curvature of a flexible display panel would help to utilize a flexible display panel more effectively.

SUMMARY

Exemplary embodiments address at least the above problems and/or disadvantages and other disadvantages may not be described above. Also, the exemplary embodiments are not required to overcome the disadvantages described above, and may not overcome any of the problems described above.

One or more exemplary embodiments provide a foldable electronic apparatus capable of varying a curvature of a flexible display panel to a desired curvature.

According to an aspect of an exemplary embodiment, there is provided an electronic apparatus including: a flexible display panel; a first cover and a second cover, each configured to support a rear surface of the flexible display panel; and a first slider and a second slider are installed on the first cover and the second cover, respectively, and are configured to vary a curvature of the flexible display panel by sliding along the first cover and the second cover, respectively.

The first cover and the second cover may be connected by a hinge member.

The first slider may be connected to a first side of the flexible display and the second slider may be connected to a second side of the flexible display panel, and each may be configured to slide in a first direction of approaching the hinge member and in a second direction of receding from the hinge member.

In response to at least one of the first slider and the second slider being moved in the first direction, the curvature of the flexible display panel may decrease, and in response to at least one of the first slider and the second slider being moved in the second direction, the curvature of the flexible display panel may increase.

The first slider may be slidably engaged with a side part of the first cover, and the second slider may be slidably engaged with a side part of the second cover.

The first slider may include a first guide and a second guide, which may be configured to be guided to an upper end of the first cover and a lower end of the first cover, respectively, wherein the second slider may include a third guide and a fourth guide, which may be configured to be guided to an upper end of the second cover and a lower end of the second cover, respectively.

The apparatus may include a first lock configured to fix a sliding position of the first slider; and a second lock configured to fix a sliding position of the second slider.

The first lock may include at least one locking protrusion configured to be disposed on one of the first slider and the first cover and at least one locking groove configured to be disposed on the other of the first slider and the first cover, wherein the second lock may include at least one locking protrusion configured to be disposed on one of the second slider and the second cover, and at least one locking groove configured to be formed on the other of the second slider and the second cover.

The first cover may include a first supporter and the second cover may include a second supporter, and the first supporter and the second supporter may be configured to support a fold of the flexible display panel.

In response to the first cover and the second cover being folded, the first cover and the second cover may have an escape groove for the first supporter and the second supporter to escape inside the first cover and the second cover, respectively, such that the fold of the flexible display panel maintains the curvature.

According to an aspect of another exemplary embodiment, there is provided an electronic apparatus including a flexible display panel; a first cover, a second cover, and a third cover, each configured to support a rear surface of the flexible display panel; and a first slider and a second slider configured to be slidably engaged with an end portion of each of the first cover and the second cover, which are located in an outer region, wherein the first slider and the second slider are configured to vary a curvature of the flexible display panel by sliding along the first cover and the second cover, respectively.

The first cover, the second cover, and the third cover may be connected by a plurality of hinge members.

The first slider may be connected to a first side of the flexible display and the second slider may be connected to a second side of the flexible display panel, and each may be configured to slide in a first direction of approaching an adjacent cover and in a second direction of receding from the adjacent cover, respectively.

In response to at least one of the first slider and the second slider being moved in the first direction, the curvature of the flexible display panel may decrease, and in response to at least one of the first slider or the second slider being moved in the second direction, the curvature of the flexible display panel may increase.

The first slider may include a first guide and a second guide, which may be configured to be guided to an upper end of the first cover and a lower end of the first cover, respectively, wherein the second slider may include a third guide and a fourth guide, which may be configured to be guided to an upper end of the second cover and a lower end of the second cover, respectively.

The apparatus may include a first lock configured to fix a sliding position of the first slider; and a second lock configured to fix a sliding position of the second slider.

The first lock may include at least one locking protrusion configured to be disposed on one of the first slider and the first cover and at least one locking groove configured to be disposed on the other of the first slider and the first cover, wherein the second lock may include at least one locking protrusion configured to be disposed on one of the second slider and the second cover and at least one locking groove configured to be formed on the other of the second slider and the second cover.

The first cover, the second cover, and the third cover may include a plurality of supporters configured to correspond to each of the plurality of hinge members to support a fold of the flexible display panel.

In response to the first cover, the second cover, and the third cover being folded, the first cover, the second cover, and the third cover may have an escape groove for the plurality of supporters to escape inside the covers, respectively, such that the fold of the flexible display panel maintains the curvature.

In response to the curvature of the flexible display panel reaching a predetermined curvature, the flexible display panel may display a User Interface (UI) corresponding to the predetermined curvature.

In response to a Graphical User Interface (GUI) displayed in the flexible display panel being selected, the flexible display panel may have a predetermined curvature to execute an application corresponding to the GUI by sliding along the first cover and the second cover and output an execution screen of the application corresponding to the GUI.

In response to the first cover and the second cover being folded, the flexible display panel may have a surface in which a part protrudes outside, and the protruded part may display a User Interface (UI).

According to one or more exemplary embodiments, usability of a flexible display panel may be enhanced.

BRIEF DESCRIPTION OF THE DRAWINGS

The above and/or other aspects of exemplary embodiments will be more apparent by describing the exemplary embodiments with reference to the accompanying drawings, in which.

DETAILED DESCRIPTION

Figure 1A:
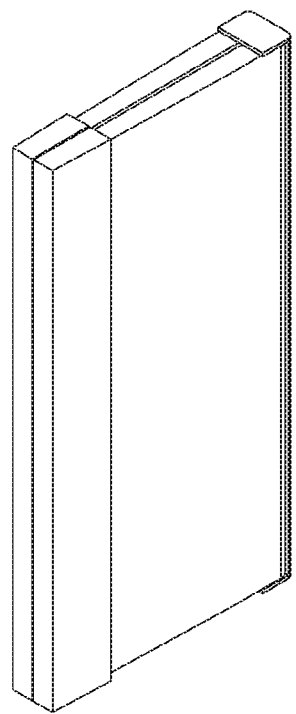
FIG. 1A is a perspective view illustrating a folded state of a foldable electronic apparatus according to an exemplary embodiment.

Exemplary embodiments are described in greater detail below with reference to the accompanying drawings.

In the following description, like reference numerals are used for like elements, even in different drawings. The matters defined in the description, such as detailed construction and elements, are provided to assist with understanding one or more exemplary embodiments. However, exemplary embodiments may be practiced without those specifically defined matters. Also, well-known functions or constructions may not be described in detail if they would obscure the application with unnecessary detail.

Figure 1B:
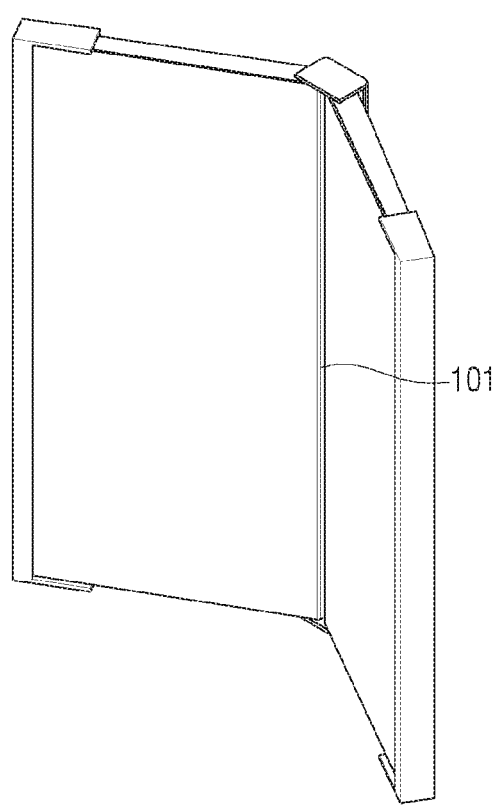
FIGS. 1B and 1C are perspective views illustrating unfolded states of a foldable electronic apparatus according to an exemplary embodiment, to illustrate a curvature of a flexible display panel according to an operation of a first slider and a second slider.
Figure 1C:
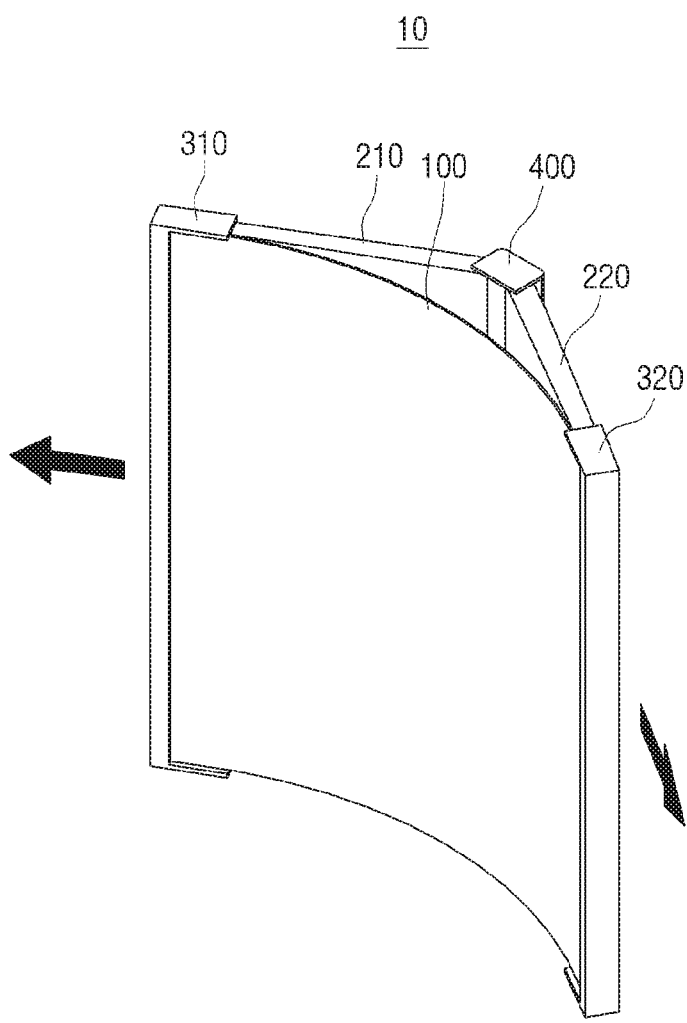

FIGS. 1A to 1C are perspective views illustrating various forms of a foldable electronic apparatus according to an exemplary embodiment.

The foldable electronic apparatus 10 may include a flexible display panel 100, a first cover 210, a second cover 220, a first slider 310, a second slider 320, and a hinge member 400.

The flexible display panel 100 may have the same curvature in its entire surfaces. Accordingly, the flexible display panel 100 may be folded in the same curvature, whichever part is folded.

The first and second covers 210, 220 support a rear surface of the flexible display panel 100 and are interconnected by the hinge member 400.

The first and second sliders 310, 320 are slidably installed on a free end portion of each of the first cover 210 and the second cover 220. In this case, the first and second sliders 310, 320 vary the curvature of the flexible display panel 100 by sliding in a direction of receding from the hinge member 400 along a length direction of the first cover 210 and the second cover 220, respectively.

The hinge member 400 has both ends which are hinge-engaged with the first cover 210 and the second cover 220, respectively. Accordingly, the first cover 210 and the second cover 220 may rotate on the hinge member 400 at an angle.

The foldable electronic apparatus 10 may change into various forms depending on a folding angle of the first cover 210 and the second cover 220.

According to an exemplary embodiment, in FIG. 1A, as the first cover 210 and the second cover 220 rotate on the hinge member 400, the foldable electronic apparatus 10 may be completely folded in an inward direction of the hinge member 400.

According to an exemplary embodiment, in FIG. 1B, the first cover 210 and the second cover 220 may rotate on the hinge member 400 and be maintained to form a mutual obtuse angle (e.g., 135 degrees). In this case, the flexible display panel 100 may be folded to form an angle with reference to a supposed centerline 101 while maintaining both surfaces flat.

According to an exemplary embodiment, in FIG. 1C, as the first slider 310 and the second slider 320 slide in a first direction of receding from the hinge member 400 while an angle between the first cover 210 and the second cover 220 is the same as in FIG. 1B, the curvature of the flexible display panel 100 may be varied to curvature greater than the curvature of the flexible display panel 100 illustrated in FIG. 1B.

The curvature of the flexible display panel 100 of the foldable electronic apparatus 10 may be varied, and thus, the foldable electronic apparatus 10 may be used in many ways. For example, when the curvature of a fold of the flexible display panel 100 is minimized as illustrated in FIG. 1B, the foldable electronic apparatus 10 may be used for an electronic dictionary or a laptop computer with a qwerty keyboard, etc. When the curvature of the fold of the flexible display panel 100 or the overall curvature of the flexible display panel 100 increases as illustrated in FIG. 1C, the foldable electronic apparatus 10 may be used for viewing an image content such as a movie, a drama, etc. When the foldable electronic apparatus 10 is folded completely as illustrated in FIG. 1A, the foldable electronic apparatus 10 may provide usefulness as a portable device.

Below, the components of the foldable electronic apparatus 10 will be described in detail with reference to the accompanying drawings.

Figure 2:
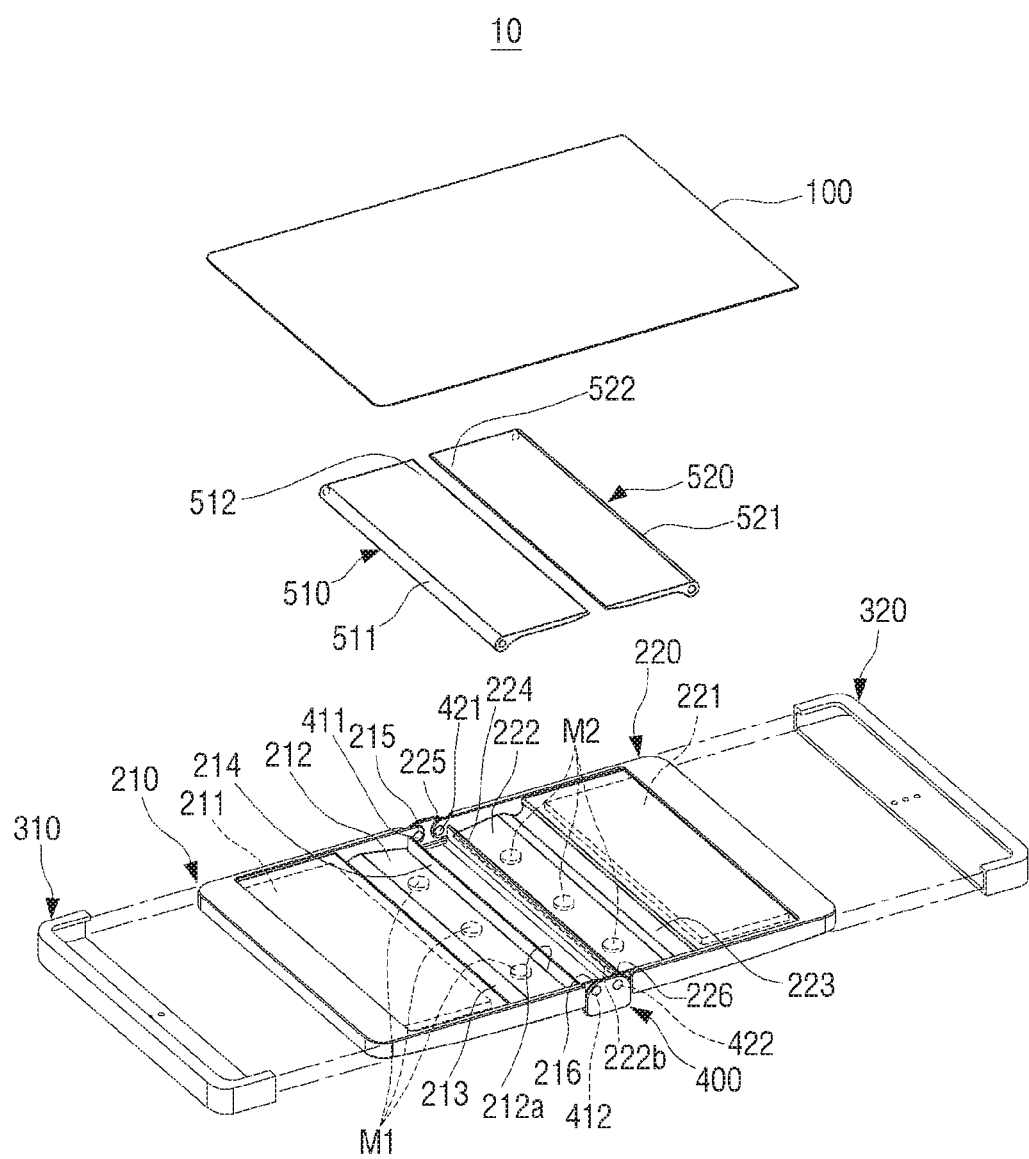
FIG. 2 is an exploded perspective view illustrating a foldable electronic apparatus according to an exemplary embodiment.

FIG. 2 is an exploded perspective view illustrating a foldable electronic apparatus 10 according to an exemplary embodiment.

Referring to FIG. 2, the foldable electronic apparatus 10 may include the flexible display panel 100, the first and second covers 210, 220, the first and second sliders 310, 320, the hinge member 400, a first supporter 510, and a second supporter 520.

The flexible display panel 100 may be realized as a touch screen which may receive a user command in a form of a touch input (e.g., a capacitive touch input or a pressure-sensitive touch input).

The flexible display panel 100 may be realized in various sizes suitable for a multitude of electronic apparatuses. For example, as a wide screen, the flexible display panel 100 may have a picture ratio (horizontal to vertical ratio) of 2.37:1 corresponding to a picture ratio of 35 mm-film frame when unfolded at a straight angle (180 degrees). In this case, the foldable electronic apparatus 10 may be realized in a size suitable to be pocketed when folded, thereby achieving portability, but it is not limited thereto. For example, the flexible display panel 100 may have a picture ratio of 4:3 or 1.33:1, or may have a picture ratio of 16:9.

The first and second covers 210, 220 are formed such that internal surfaces supporting the flexible display panel 100 are flat. The first and second covers 210, 220 have a first storage 211 and a second storage 221 for storing electronic parts, such as, a circuit board, a battery, etc., inside the covers.

In this case, the electronic parts, which may be separately installed in the first storage 211 and the second storage 221 (e.g., a Printed Circuit Board (PCB)), may be connected electrically through a Flexible Printed Circuit Board (FPCB).

The first and second covers 210, 220 may include the first supporter 510 and the second supporter 520 for supporting the fold of the flexible display panel 100.

The first and second covers 210, 220 may have an escape groove for the first and second supports 510, 520 to escape inside the first and second covers 210, 220 such that the fold of the flexible display panel 100 maintains a curvature when the first and second covers 210, 220 are folded.

In addition, the first and second supporters 510, 520 are arrayed in parallel in an overlapping manner in adjacent areas 212, 222 of the first and second covers 210, 220. In this case, curved grooves 213, 223 to which curved protrusions 511, 521 of the first and second supporters 510, 520 are inserted slidably are formed on the first and second covers 210, 220. The detailed descriptions on the operations of the first and second supporters 510, 520 will be provided below with reference to FIG. 5.

A plurality of magnets M1, M2 are embedded into the adjacent areas 212, 222 of the first and second covers 210, 220, respectively. In this case, the first and second supporters 510, 520 are pulled to the adjacent areas 212, 222 of the first and second covers 210, 220 by gravitation between the plurality of magnets M1, M2 and the first and second supporters 510, 520 formed with a magnetic substance. Accordingly, free end portions 512, 522 of the first and second supporters 510, 520 maintain a contact state with respect to an upper end of each of a first wall 214 and a second wall 224 of the hinge member 400, to prevent the fold of the flexible display panel 100, which is bent at a curvature at a first position from being pressurized by the first and second supporters 510, 520.

As described above, the first and second supporters 510, 520 may be equipped with the plurality of magnets M1, M2 to prevent the fold of the flexible display panel 100 from being pressurized when the first and second covers 210, 220 are folded, but they are not limited thereto.

For example, a part or an entire part of the hinge member 400 (for example, the first and second walls 214, 224) may be magnetized such that the first and second supporters 510, 520 formed with the magnetic substance are pulled towards the hinge member 400. Alternatively, a part or an entire part of the first and second supporters 510, 520 (for example, the free end portions 512, 522) may be magnetized, and the hinge member 400 may be made of a magnetic substance.

Both ends of a side of the first cover 210 are hinge-engaged with a couple of first hinge protrusions 411, 412, which protrude inside both ends of the hinge member 400, and a couple of second hinge protrusions 215, 216, which protrude outside both ends of hinge member 400. Both ends of a side of the second cover 220 are hinge-engaged with a couple of first hinge protrusions 421, 422, which protrude inside both ends of the hinge member 400, and a couple of second hinge protrusions 225, 226, which protrude outside the both ends of the hinge member 400. Accordingly, the first and second covers 210, 220 may rotate on the first hinge protrusions 411, 412, 421, 422, and the second hinge protrusions 215, 216, 225, 226.

Figure 3A:
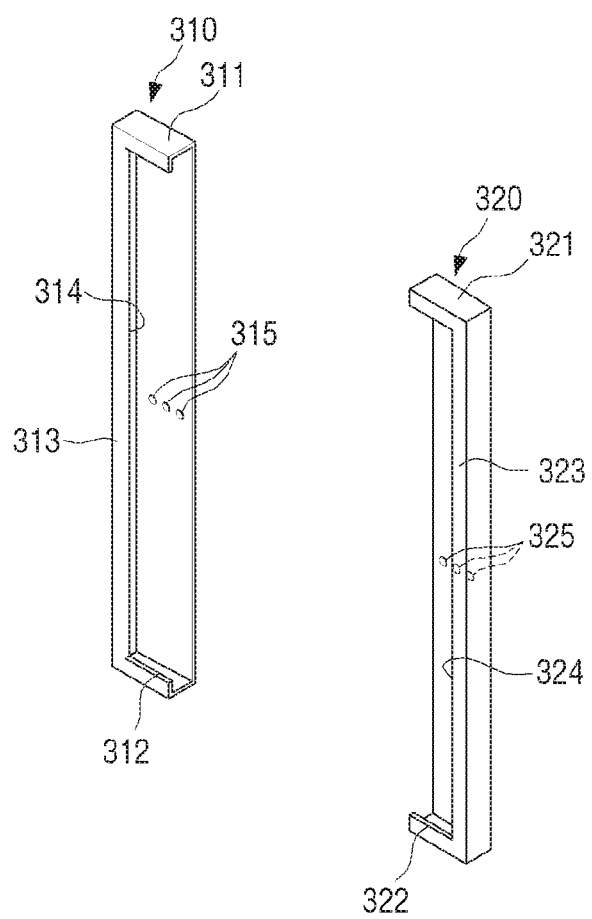
FIG. 3A is a perspective view illustrating a first slider and a second slider of FIG. 2.
Figure 3B:
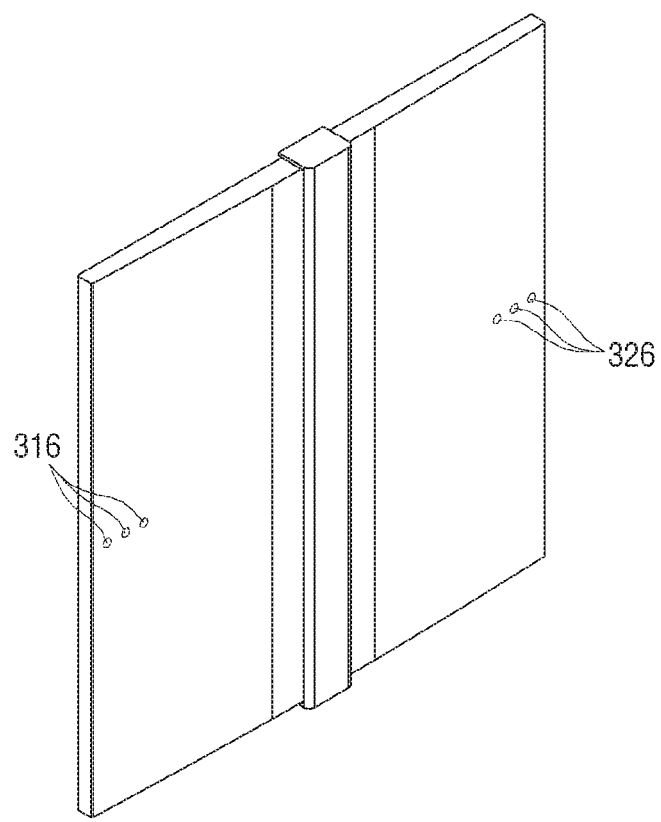
FIG. 3B is a perspective view illustrating a first cover and a second cover of FIG. 2.

FIG. 3A is a perspective view illustrating a first slider and a second slider of FIG. 2, and FIG. 3B is a perspective view illustrating a first cover and a second cover of FIG. 2.

The first and second sliders 310, 320 may be partially engaged with both sides of the flexible display panel 100 and slide in a first direction of approaching the hinge member 400 and in a second direction of receding from the hinge member 400.

The first slider 310 may be slidably engaged with the free end portion of the first cover 210, and the second slider 320 may be slidably engaged with the free end portion of the second cover 220. Referring to FIG. 3A, the first slider 310 may include a couple of first guide units 311, 312 (e.g., guides) which are guided to an upper end and a lower end of the first cover 210, respectively, and the second slider 320 may include a couple of second guide units 321, 322 which are guided to an upper end and a lower end of the second cover 220, respectively.

In addition, referring to FIG. 3A, the first and second sliders 310, 320 may be equipped with engagement units 313, 323 (e.g., engagers) which are connected to the both ends of the flexible display panel 100. In this case, the engagement units 313, 323 of the first and second sliders 310, 320 may be connected to the flexible display panel 100 by bonding. For example, an adhesive substance may be coated such that the both ends of the flexible display panel 100 and internal surfaces of the engagement units 313, 323 are bonded to each other. The adhesive substance may be an adhesive or an adhesive tape, but it is not limited to these. The engagement units 313, 323 of the first and second sliders 310, 320 may be connected through an engagement hole, instead of the bonding. For example, protrusions formed on the both ends of the flexible display panel 100 may be inserted into the engagement holes formed on the engagement units 313, 323 such that the flexible display panel 100 and the first and second sliders 310, 320 are engaged with each other.

Referring to FIGS. 3A and 3B, the first and second sliders 310, 320 may further include first locking units 315, 316 (e.g., locks) for fixing a sliding position of the first slider 310 and second locking units 325, 326 for fixing a sliding position of the second locking unit 325, 326. In this case, the first locking units 315, 316 include at least one locking protrusion 316 which is arrayed on one of the first slider 310 and the first cover 210 and at least one locking groove 315 which is formed on the other one of the first slider 310 and the first cover 210. In addition, the second locking units 325, 326 include at least one locking protrusion 326 which is arrayed on one of the second slider 320 and the second cover 220 and at least one locking groove 325 which is formed on the other one of the second slider 320 and the second cover 220.

Figure 4A:
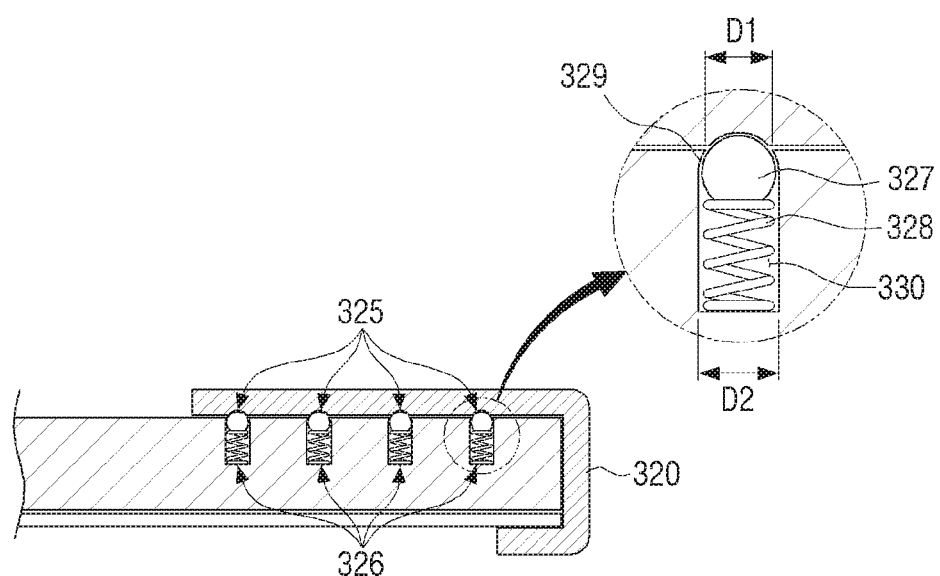
FIGS. 4A to 4C are partial expanded sectional views illustrating operations of the first slider, which slides along the first cover in a sequential order.
Figure 4B:
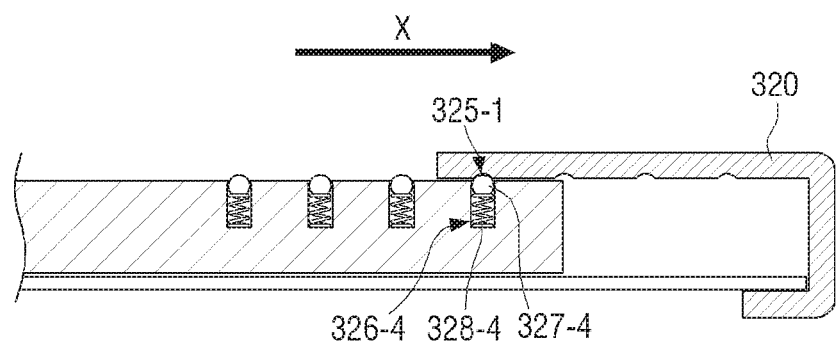
Figure 4C:
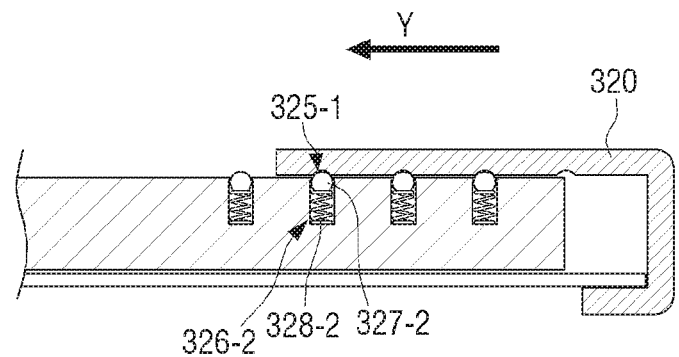

FIGS. 4A to 4C are partial expanded sectional views illustrating operations of the first slider which slides along the first cover in a sequential order.

Referring to FIG. 4A, the locking protrusion 326 is formed on the second cover 220. The locking protrusion 326 includes a spring 328 for generating tension and a ball 327. In this case, an internal space 330 of the locking protrusion 326 may be formed in a cylindrical shape, and a diameter of the uppermost portion of the internal space 327 may be formed to be small. A diameter D1 of the uppermost portion of the internal space 330 has a value less than a value of a diameter D2 of the other portion of the internal space 330. In addition, the ball 327 has a value less than D2 and greater than D1. Accordingly, only a part of the ball 329 may be exposed to an outside of the locking protrusion 326.

In FIG. 4B, in response to a force being applied to the second slider 320 in an X direction, the ball 327-4 shrinks the spring 328-4 downwards, and the second slider 320 may be moved in the X direction to which the force is applied. Subsequently, in response to the second slider 320 sliding until a first locking groove 325-1 of the second slider 320 comes into contact with a fourth locking protrusion 326-4, the first locking groove 325-1 of the second locking units 325, 326 is locked with a ball 327-4 of the fourth locking protrusion 326-4 of the second locking units 325, 326. In this case, the second slider 320 may remain still.

Subsequently, as illustrated in FIG. 4C, in response to a force being applied to the second slider 320 in a Y direction, the ball 327-2 shrinks the spring 328-2 downwards, and the second slider 320 may be moved in the Y direction to which the force is applied. Subsequently, in response to the second slider 320 sliding until the first locking groove 325-1 of the second slider 320 comes into contact with a second locking protrusion 326-2, the first locking groove 325-1 of the second locking units 325, 326 is locked with a ball 327-2 of the second locking protrusion 326-2 of the second locking units 325, 326. In this case, the second slider 320 may remain still.

According to an exemplary embodiment described above, the locking grooves 315, 325 are formed on the first and second sliders 310, 320, and the locking protrusions 316, 326 are formed on the first and second covers 210, 220. However, the locking grooves 315, 325 may be formed on the first and second covers 210, 220, and the locking protrusions 316, 326 may be formed on the first and second sliders 310, 320.

According to an exemplary embodiment described above, the locking grooves 315, 325 and the locking protrusions 316, 326 are used to stop the first and second sliders 310, 320 in phases after sliding, but this is only an example. That is, exemplary embodiments may employ various methods for stopping the first and second sliders 310, 320 in succession or in phases after sliding.

In response to the above-described sliding operation of the first and second sliders 310, 320, the flexible display panel 100 may slide. In response to the first and second sliders 310, 320 being moved in the first direction of approaching the hinge member 400, the curvature of the flexible display panel 100 may decrease gradually, and in response to the first and second sliders 310, 320 being moved in the second direction of receding from the hinge member 400, the curvature of the flexible display panel 100 may increase gradually.

Figure 5:
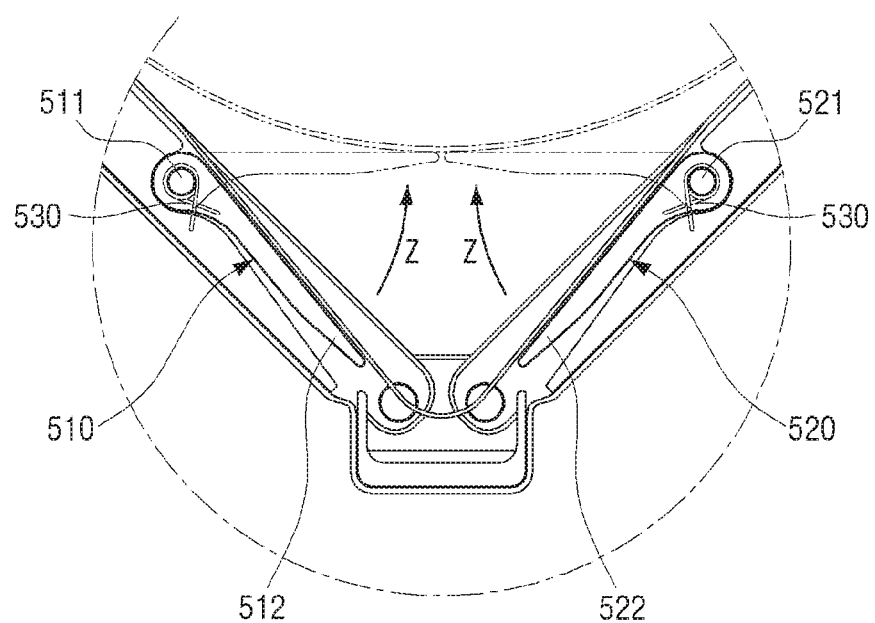
FIG. 5 is a view illustrating a movement of a first supporter and a second supporter.

FIG. 5 is a view illustrating a movement of the first supporter 510 and the second supporter 520.

FIG. 5 illustrates a state in which the first and second sliders 310, 320 have been stopped after sliding in the second direction of receding from the hinge member 400 while the first and second covers 210, 220 form an angle. In this case, the free end portions 512, 522 of the first and second supporters 510, 520 rotate on a couple of third hinge protrusions 511 and a couple of fourth hinge protrusions 521 formed on the first and second covers 210, 220 in a Z direction and support a lower part of the flexible display panel 100. Accordingly, a movement that might occur when the flexible display panel 100 is touched may be prevented.

The first and second supporters 510, 520 support the rear surface of the flexible display panel 100 consequently as the flexible display panel 100 slides. To perform this operation, a torsion spring 530 may be installed in the couple of third hinge protrusions 511 on the first cover 210 and the couple of fourth hinge protrusions 521 on the second cover 220, for example. Referring to FIG. 5, the torsion spring 530 may consistently apply force of rotating the first and second supporters 510, 520 in a Z direction.

The rotational force that the torsion spring 530 rotates the first and second supporters 510, 520 to support the flexible display panel 100 may be configured to be smaller than force that the first and second locking units 315, 316, 325, 326 stop the first and second sliders 310, 320, to prevent the first and second sliders 310, 320 from being pushed in an opposite direction of the hinge member 400 by the force of the torsion spring 530. To control the rotational force of the torsion spring 530, the gravitation of the plurality of magnets M1, M2 embedded in the adjacent areas 212, 222 of the first and second covers 210, 220 may be used.

Figure 6:
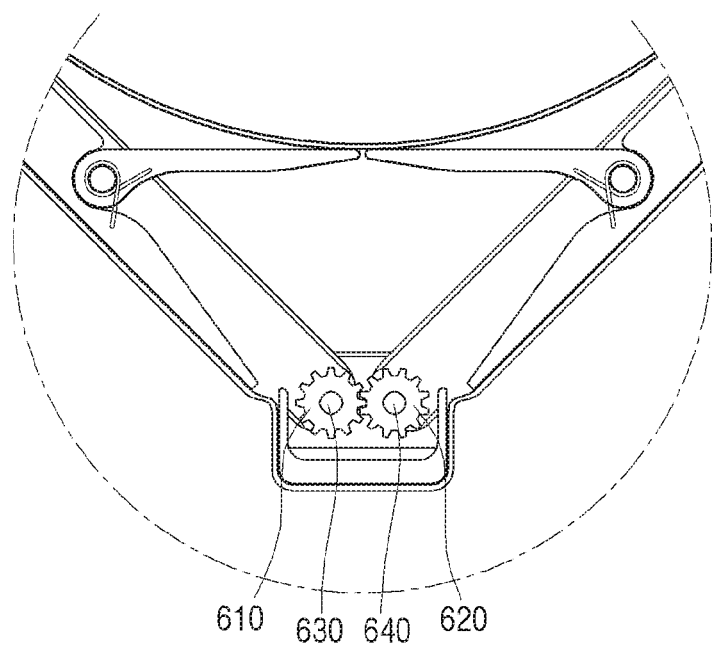
FIG. 6 is a schematic view illustrating an engaged state of a first gear and a second gear formed on the first cover and the second cover.

FIG. 6 is a schematic view illustrating an engaged state of a first gear 610 and a second gear 620 formed on the first cover 210 and the second cover 220.

Referring to FIG. 6, the first cover 210 may be equipped with the first gear 610 on either end. The first gear 610 may be fixed to the first cover 210, and a first hinge protrusion 630 may penetrate through the first gear 610 such that the first gear 610 may rotate.

In addition, the second cover 220 may be equipped with the second gear 620 on either end. The second gear 620 may be fixed to the second cover 220, and a second hinge protrusion 640 may penetrate through the second gear 620 such that the second gear 620 may rotate. As the second gear 620 is engaged with the first gear 610, the first and second covers 210, 220 may be synchronized and folded in perfect symmetry when the first and second covers 210, 220 rotate on the first hinge protrusions 411, 412 and the second hinge protrusions 421, 422.

Below, one or more exemplary embodiments of the foldable electronic apparatus 10 will be described in detail with reference to FIGS. 7 to 10.

Figure 7:
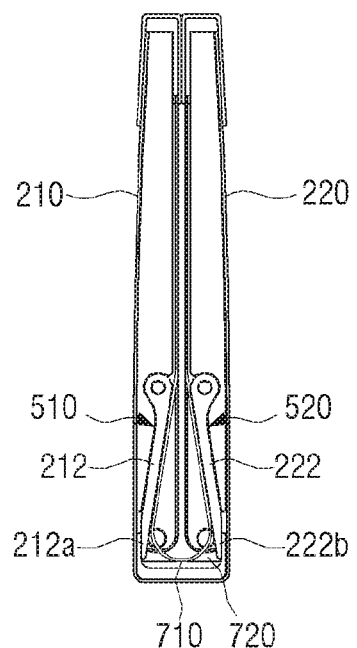
FIG. 7 is a cross-sectional view illustrating a folded state of a foldable electronic apparatus according to an exemplary embodiment.

FIG. 7 is a cross-sectional view illustrating a folded state of the foldable electronic apparatus 10 according to an exemplary embodiment.

Referring to FIG. 7, the adjacent areas 212, 222 of the first and second covers 210, 220 are formed in an inclined manner such that a thickness decreases gradually toward ends 212a, 222b of the first and second covers 210, 220. As the adjacent areas 212, 222 incline, the first and second supporters 510, 520 may rotate at an angle to be spaced a distance apart from the adjacent areas 212, 222 in response to the first and second covers 210, 220 being folded. As the first and second supporters 510, 520 are configured to rotate at an angle, a space 720 may be formed. The space 720 may bent naturally in such a way that a fold 710 of the flexible display panel 100 has a curvature in response to the first and second covers 210, 220 being folded. Accordingly, the foldable electronic apparatus 10 may prevent a damage or deterioration of durability of the fold 710 of the flexible display panel 100.

Figure 8:
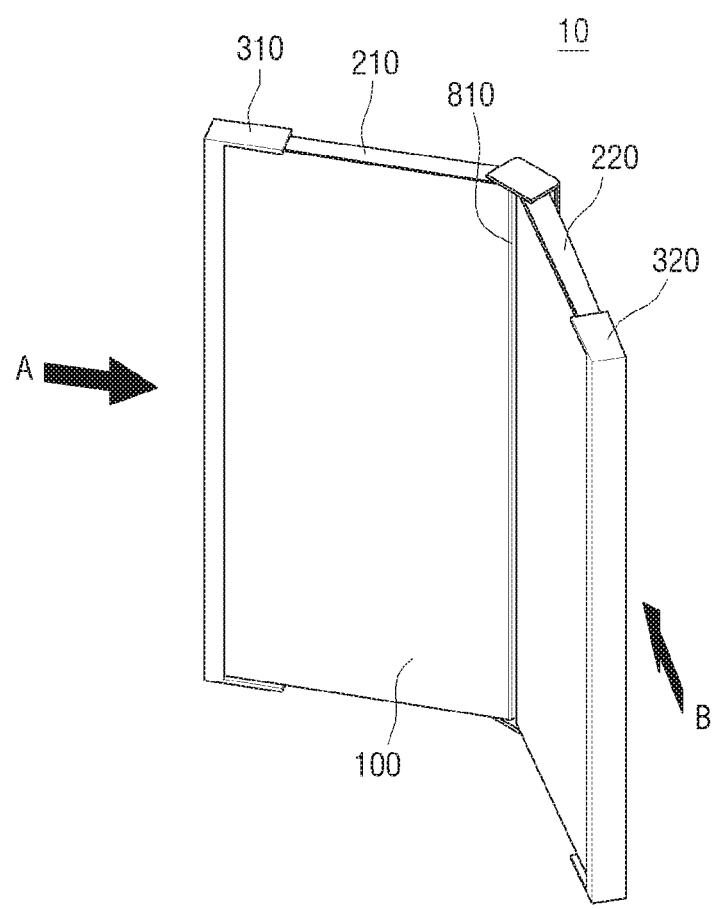
FIG. 8 is a perspective view illustrating a state in which a foldable electronic apparatus is unfolded at an angle, according to an exemplary embodiment.

FIG. 8 is a perspective view illustrating a state in which the foldable electronic apparatus 10 is unfolded at an angle, according to an exemplary embodiment.

Referring to FIG. 8, the first and second covers 210, 220 of the foldable electronic apparatus 10 are unfolded to form an angle. In this case, the first and second sliders 310, 320 may slide in an A direction and in a B direction, respectively, so that the flexible display panel 100 remains flat in areas excluding an axis 810 forming a curvature. In this case, the flexible display panel 100 may be used as an electronic dictionary mode, etc.

Figure 9A:
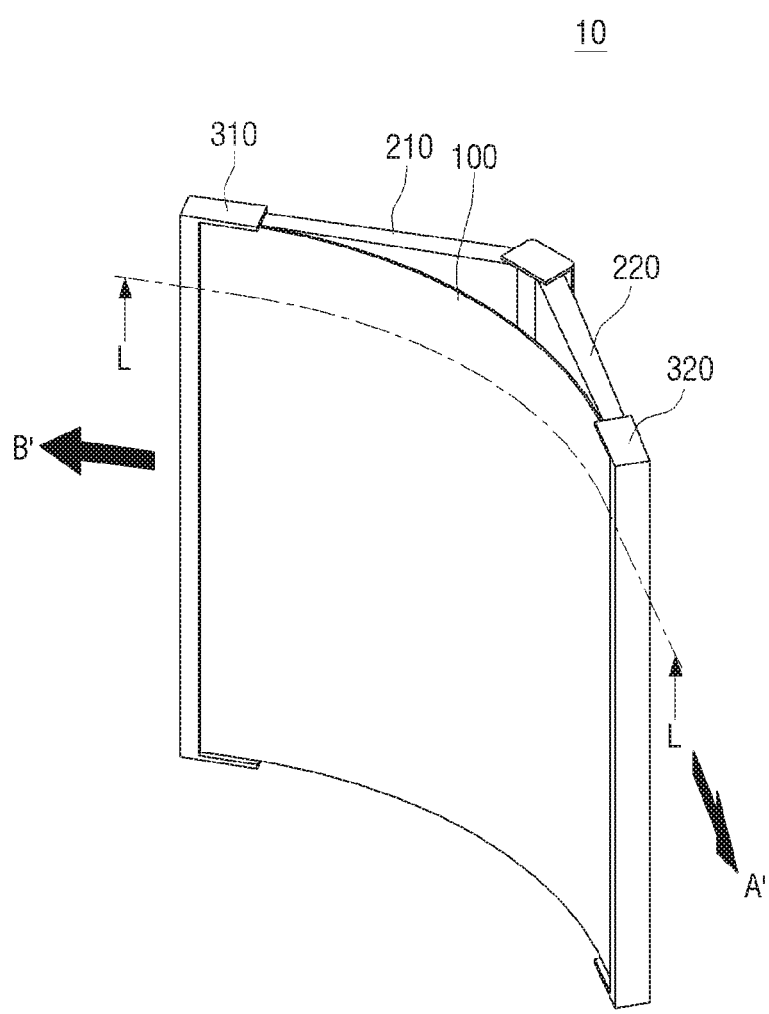
FIG. 9A is a perspective view illustrating a state in which curvature of a flexible display panel has been varied by moving the first slider and the second slider while a foldable electronic apparatus is unfolded at an angle, according to an exemplary embodiment.

FIG. 9A is a perspective view illustrating a state in which curvature of the flexible display panel 100 has been varied by moving the first slider 310 and the second slider 320 while the foldable electronic apparatus 10 is unfolded at an angle.

In FIG. 9A, the foldable electronic apparatus 10 maintains the angle between the first and second covers 210, 220 formed in FIG. 8. In response to the first and second sliders 310, 320 sliding in an A' direction and in a B' direction, the curvature of the flexible display panel 100 may become greater than the curvature in FIG. 8. In this case, the flexible display panel 100 may be used as diverse image reproduction modes.

Figure 9B:
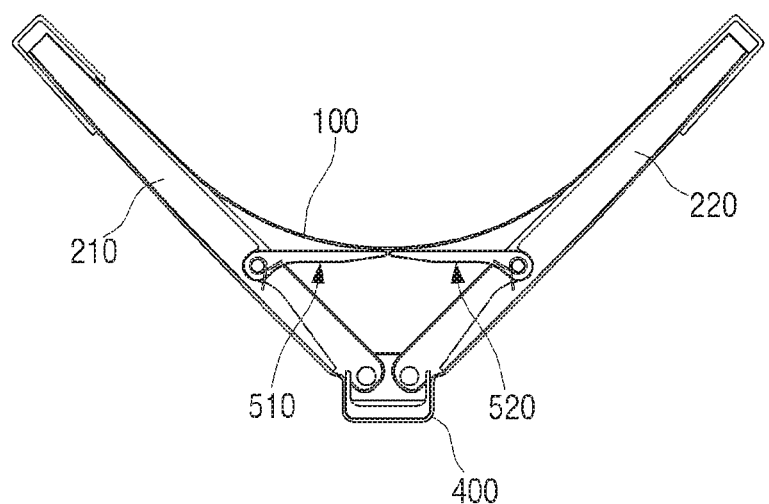
FIG. 9B is a cross-sectional view based on a 'L-L' line of FIG. 9A.

FIG. 9B is a cross-sectional view based on a 'L-L' line of FIG. 9A.

As the flexible display panel 100 forms a curvature, a space is formed between the flexible display panel 100 and the hinge member 400, and between the first cover 210 and the second cover 220. In this case, the flexible display panel 100 may be moved. To fix the flexible display panel 100, the first and second supporters 510, 520 may support the rear surface of the flexible display panel 100.

Figure 10:
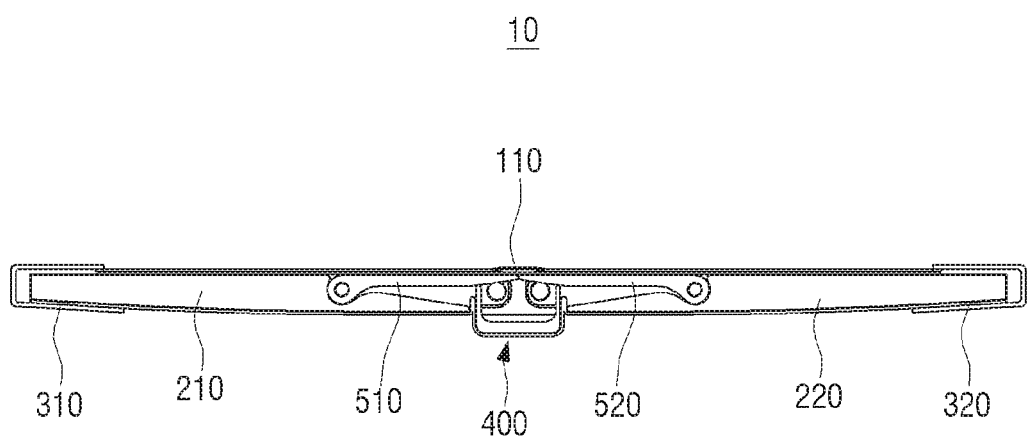
FIG. 10 is a cross-sectional view illustrating a state in which a foldable electronic apparatus is unfolded at a straight angle, according to an exemplary embodiment.

FIG. 10 is a cross-sectional view illustrating a state in which the foldable electronic apparatus 10 according to an exemplary embodiment is unfolded at a straight angle.

Referring to FIG. 10, the foldable electronic apparatus 10 may be unfolded at a straight angle.

In this case, the first and second supporters 510, 520 are located on substantially the same plane as the first and second covers 210, 220 while coming into contact with and being supported by the first and second walls 214, 224 of the hinge member 400.

Accordingly, the flexible display panel 100 is supported while maintaining flatness by the first and second covers 210, 220 and the first and second supporters 510, 520. In this case, the flexible display panel 100 is supported in an entire dimension by the first and second covers 210, 220 and the first and second supporters 510, 520.

Accordingly, when a user touches the flexible display panel 100 (or a fold 110 of the flexible display panel 100), the foldable electronic apparatus 10 is not moved in the touching direction at a touch point. Thus, an accurate touch operation may be performed.

Figure 11:
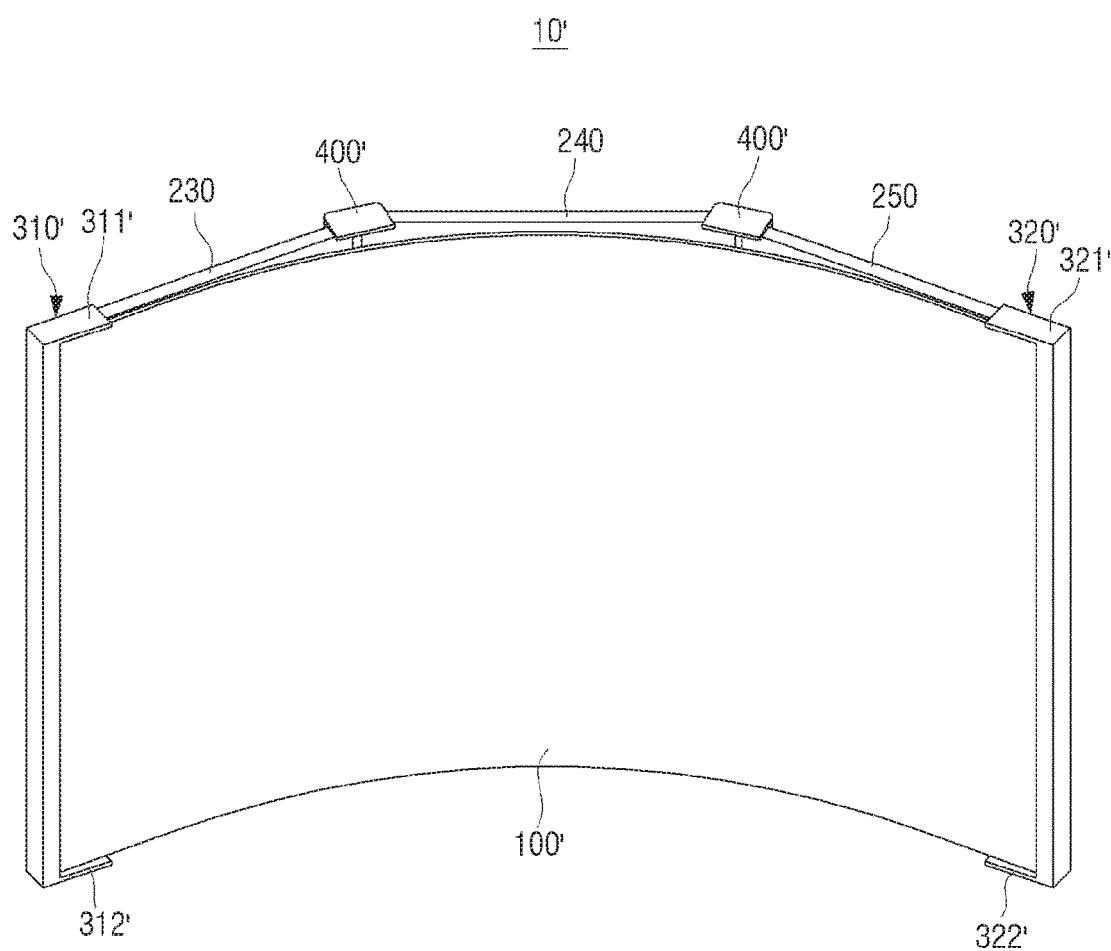
FIG. 11 is a perspective view illustrating a foldable electronic apparatus having three or more covers, according to another exemplary embodiment.

FIG. 11 is a perspective view illustrating a foldable electronic apparatus 10 having three or more covers 230, 240, 250 according to another exemplary embodiment.

Referring to FIG. 11, the foldable electronic apparatus 10 may include a flexible display panel 100', at least three or more covers 230, 240, 250 configured to be interconnected by a plurality of hinge members 400', and a first slider 310' and a second slider 320' configured to be slidably engaged with a free end portion of each of the first cover 230 and the second cover 250 located in the outermost region among the covers 230, 240, 250. The first and second sliders 310', 320' may vary curvature of the flexible display panel 100' by an operation of sliding along the first cover 230 and the second cover 250.

The first and second sliders 310', 320' of the foldable electronic apparatus 10' are engaged with both sides of the flexible display panel 100', respectively. In addition, the first and second sliders 310', 320' may slide in a first direction of approaching the adjacent cover 240 and in a second direction of receding from the adjacent cover 240.

In response to the first and second sliders 310', 320' being moved in the first direction, the curvature of the flexible display panel 100' may decrease gradually, and in response to the first and second sliders 310', 320' being moved in the second direction, may increase gradually.

The first slider 310' may include a couple of first guide units 311', 312' which are guided to an upper end and a lower end of the first cover 230, respectively. In addition, the second slider 320' may include a couple of second guide units 321', 322' which are guided to an upper end and a lower end of the second cover 240, respectively.

The foldable electronic apparatus 10' may further include a first locking unit for fixing a sliding position of the first slider 310' and a second locking unit for fixing a sliding position of the second slider 320'.

The first locking unit may include at least one locking protrusion which is arrayed on one of the first slider 310' and the first cover 230 and at least one locking groove which is formed on the other one of the first slider 310' and the first cover 320. In addition, the second locking unit may include at least one locking protrusion which is arrayed on one of the second slider 320' and the second cover 250 and at least one locking groove which is formed on the other one of the second slider 320' and the second cover 250.

The covers 230, 240, 250 may include a plurality of supporters which correspond to each of the plurality of hinge members 400' to support a fold of the flexible display panel 100' flexibly.

In addition, the covers 230, 240, 250 may have an escape groove for the plurality of supports to escape inside the covers 230, 240, 250 such that the fold of the flexible display panel 100' maintains a curvature when the covers 230, 240, 250 are folded.

Comparing the foldable electronic apparatus 10' having the three or more covers 230, 240, 250 with the foldable electronic apparatus 10 having two covers 210, 220, a shape of the apparatus may be varied according to the same structure and operating method, except for increase of the hinge members and supporters due to increase of the number of covers.

Figure 12:
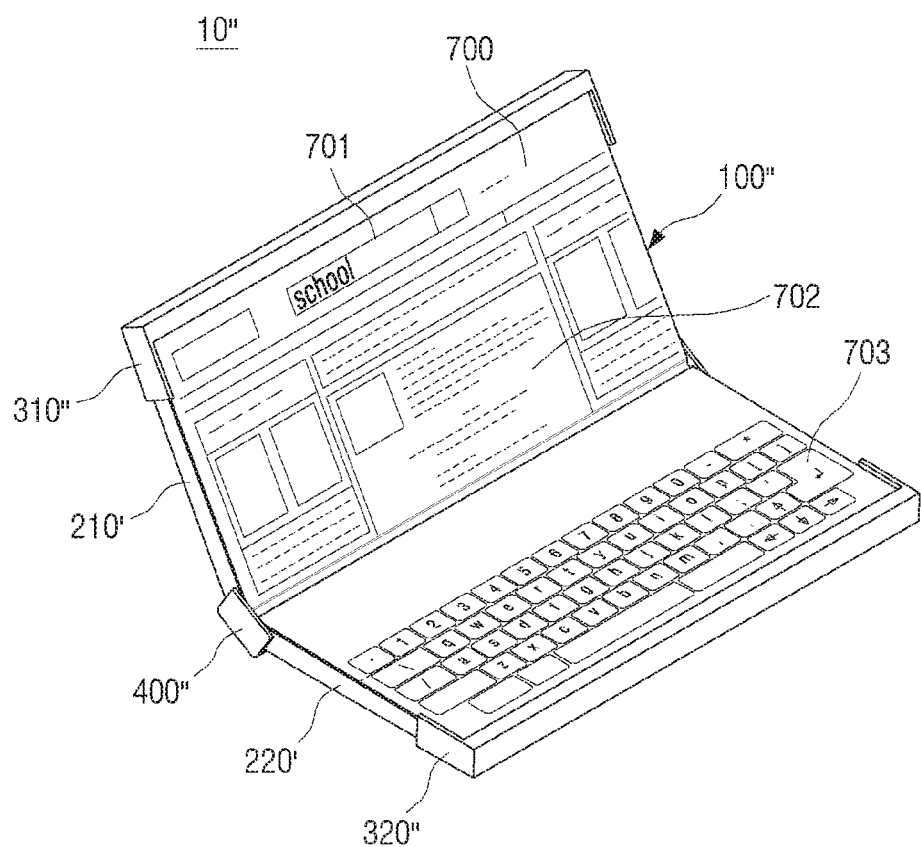
FIG. 12 is a view illustrating a User Interface (UI) outputting in a foldable electronic apparatus, according to an exemplary embodiment.

FIG. 12 is a view illustrating a User Interface (UI) 700 outputted in a foldable electronic apparatus 10" according to an exemplary embodiment.

In the foldable electronic apparatus 10", in response to curvature of a flexible display panel 100" reaching a predetermined curvature by a sliding operation, the UI 700 corresponding to the predetermined curvature may be displayed in the flexible display panel 100".

According to an exemplary embodiment, a first slider 310" and a second slider 320" slide towards a hinge member 400" while a first cover 210' and a second cover 220' of the foldable electronic apparatus 10" are unfolded by 130 degrees. In this case, in response to the curvature of the flexible display panel 100" reaching predetermined first curvature (e.g., 3 mm), the UI 700 corresponding to the first curvature is outputted. As an example, the UI 700 may correspond to an electronic dictionary. In this case, the UI 700 may include a word search box 701, a search result pane 702, and a qwerty keyboard 703.

Figure 13:
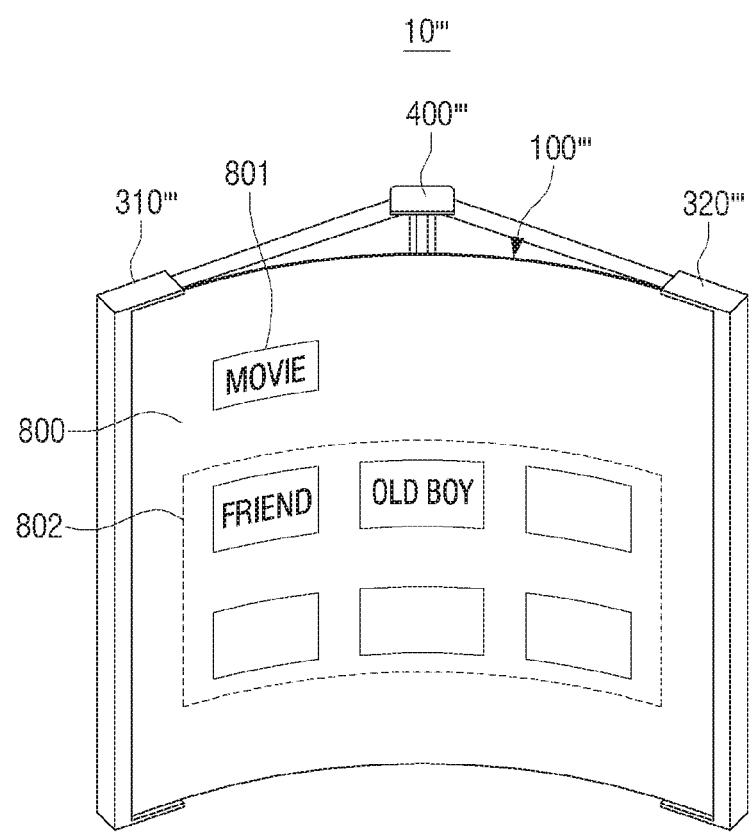
FIG. 13 is a view illustrating a UI outputting in a foldable electronic apparatus, according to another exemplary embodiment.

FIG. 13 is a view illustrating a User Interface (UI) 800 outputted in a foldable electronic apparatus 10''' according to another exemplary embodiment.

According to an exemplary embodiment, in a state of the foldable electronic apparatus 10''' of FIG. 12, a first slider 310''' and a second slider 320''' slide towards a hinge member 400'''. In this case, in response to curvature of a flexible display panel 100''' reaching a predetermined second curvature, the UI 800 corresponding to the predetermined second curvature (e.g., 20 cm) is outputted. As an example, the UI 800 may be a UI for selecting a movie content. In this case, the UI 800 may include a GUI 802 corresponding to a plurality of movie contents and a MOVIE GUI 801 showing that a content is a movie.

Figure 14A:
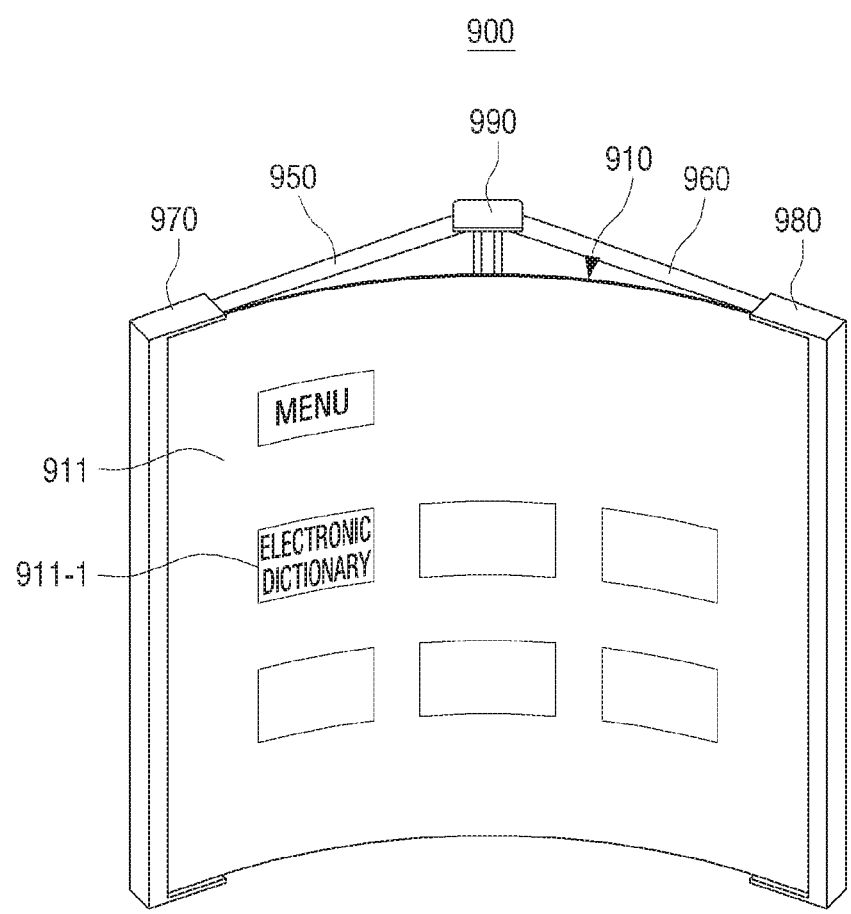
FIGS. 14A to 14C are views illustrating an example in which a foldable electronic apparatus is realized as a tablet Personal Computer (PC), according to an exemplary embodiment.
Figure 14B:
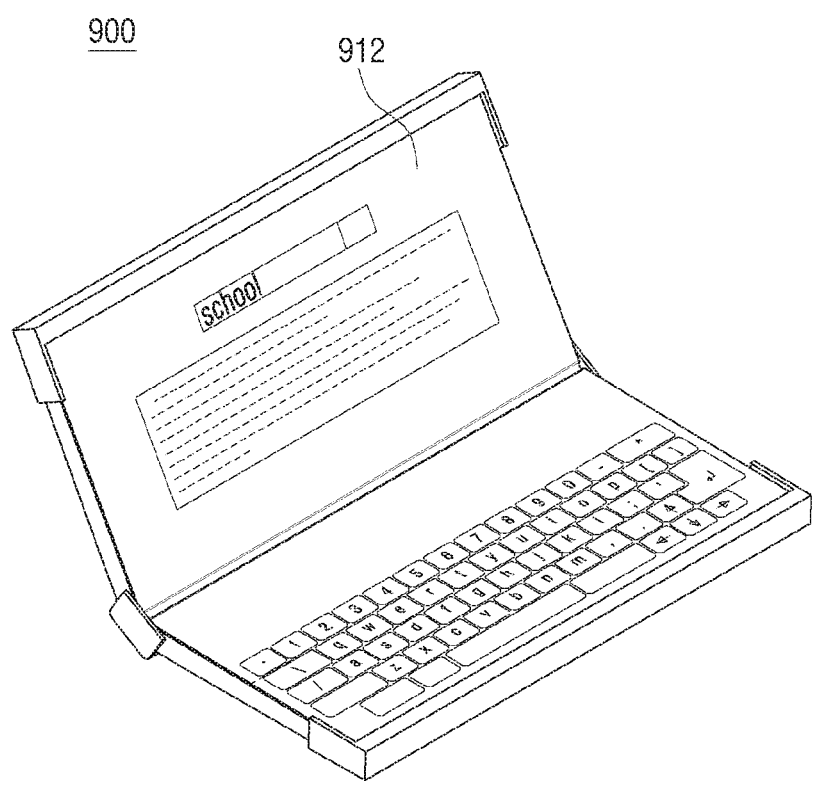
Figure 14C:
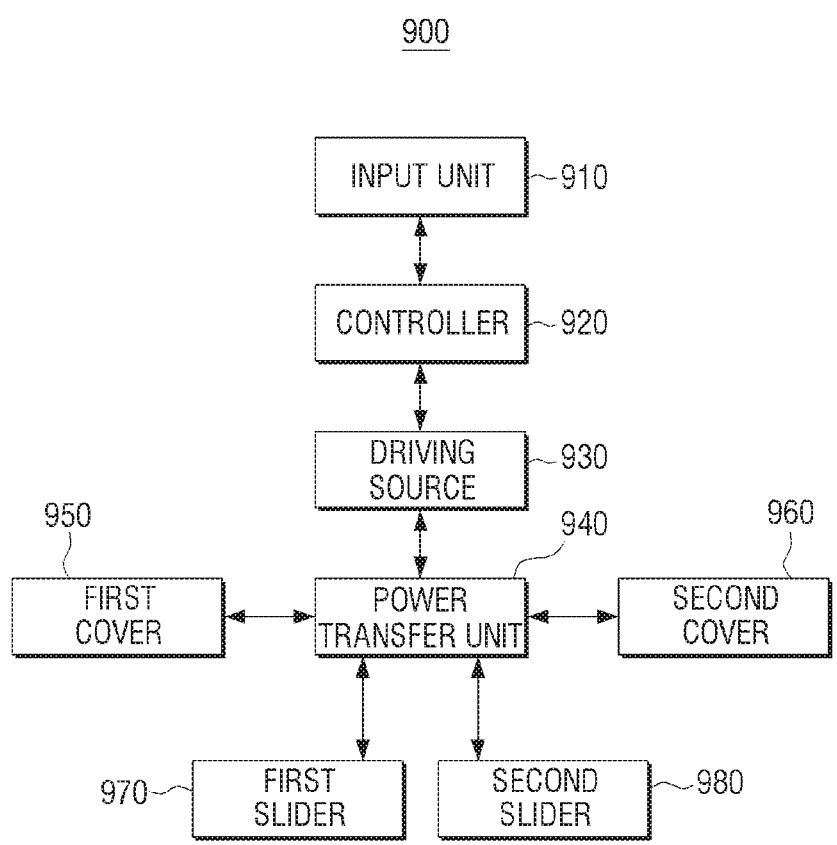

FIGS. 14A to 14C are views provided to describe an example in which the foldable electronic apparatus 10 according to an exemplary embodiment is realized as a tablet Personal Computer (PC) 900.

In response to GUI 911-1 displayed in a flexible display panel 910 being selected, the flexible display panel 910 of the tablet PC 900 may have predetermined curvature to execute an application corresponding to the GUI 911-1 by a sliding operation, and an execution screen of the application corresponding to the GUI 911-1 may be outputted in the flexible display panel 910.

To perform this operation, the tablet PC 900 may drive a first cover 950, a second cover 960, a first slider 970, and a second slider 980.

By way of example with reference to FIGS. 14A, 14B, and 14C, the tablet PC 900 may include an input unit 910 (e.g., input interface), a controller 920, a driving source 930, a power transfer unit 940 (e.g., power transferor), the first and second covers 950, 960, and the first and second sliders 970, 980.

The input unit 910 may be the flexible display panel 910. In response to the GUI 911-1 corresponding to an electronic dictionary being selected in the input unit 910, the controller 920 may control the driving source 930 to vary curvature of the flexible display panel 910 from the curvature of FIG. 14A to curvature (e.g., 3 mm) suitable to execute an electronic dictionary application. The driving source 930 may be a motor, for example. The driving source 930 is connected to the power transfer unit 940. The power transfer unit 940 may transfer rotational force generated in the driving source 930 to the first and second covers. In addition, the power transfer unit 940 may convert the rotational force generated in the driving source 930 to a rectilinear movement and transfer the rectilinear movement to the first and second sliders 970, 980. In this case, the power transfer unit 940 may drive the first and second covers 950, 960 to form a cover angle to execute the electronic dictionary application and drive the first and second sliders 970, 980 to form a predetermined curvature to execute the electronic dictionary application. Consequently, as illustrated in FIG. 14, the tablet PC 900 may form the cover angle to execute the electronic dictionary application, concurrently with outputting a UI 912 corresponding the electronic dictionary application.

Figure 15:
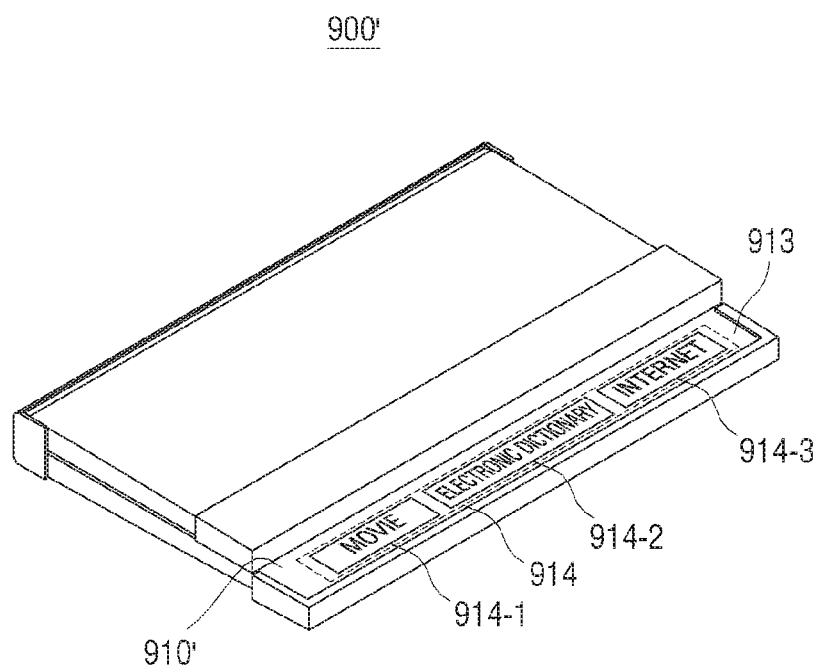
FIG. 15 is a view illustrating an example in which a foldable electronic apparatus is realized as a tablet PC, according to an exemplary embodiment.

FIG. 15 is a view illustrating an example in which a foldable electronic apparatus 10 according to another exemplary embodiment is realized as a tablet PC 900'.

In response to the tablet PC 900' being folded, a part 913 of a surface of a folded flexible display panel 910' protrudes outside, and a UI 914 may be displayed in the protruded part 913.

FIG. 15 illustrates a state in which the tablet PC 900' is folded. In this case, a flexible display panel 910' mounted on the tablet PC 900' may be asymmetrical when folded such that the part 913 of the flexible display panel 910' is exposed to an outside. In this case, a UI 914 including a plurality of GUIs 914-1, 914-2, 914-3 corresponding to a plurality of applications may be outputted in the part 913 of the flexible display panel 910'. As an example, the tablet PC 900' may include the components of FIG. 14C. In response to a MOVIE GUI 914-4 being selected, the tablet PC 900' may have a form illustrated in FIG. 14A. In response to an electronic dictionary GUI 914-2 being selected, the tablet PC 900' may have a form illustrated in FIG. 14B.

According to an exemplary embodiment described above, a foldable electronic apparatus 10 is realized as the tablet PC 900, 900'. However, the foldable electronic apparatus 10 may be realized as a non-portable electronic apparatus, such as, a TV, a PC, etc., as well as a portable electronic apparatus, such as, a mobile phone, a Personal Digital Assistant (PDA), an electronic dictionary, a laptop PC, etc.

One or more exemplary embodiments have been shown and described above. The exemplary embodiments are merely exemplary and are not to be construed as limiting the present teaching. The present teaching can be readily applied to other types of devices. Also, the description of exemplary embodiments is intended to be illustrative, and not to limit the scope of the claims, and many alternatives, modifications, and variations will be apparent to those skilled in the art.

What is claimed is:

1. An electronic apparatus comprising:
a flexible display panel;
a first cover and a second cover, each configured to support a rear surface of the flexible display panel; and
a first slider and a second slider installed on the first cover and the second cover, respectively,
wherein the first slider and the second slider are configured to vary a curvature of the flexible display panel by sliding along the first cover and the second cover, respectively, and
wherein the curvature of the flexible display panel is varied according to the sliding of the first slider and the second slider while an angle between the first cover and the second cover is maintained.

2. The apparatus as claimed in claim 1, wherein the first cover and the second cover are connected by a hinge member.

3. The apparatus as claimed in claim 2, wherein the first slider is connected to a first side of the flexible display panel and the second slider is connected to a second side of the flexible display panel, and each of the first slider and the second slider is configured to slide in a first direction of approaching the hinge member and in a second direction of receding from the hinge member.

4. The apparatus as claimed in claim 3, wherein in response to at least one of the first slider and the second slider being moved in the first direction, the curvature of the flexible display panel decreases, and in response to at least one of the first slider and the second slider being moved in the second direction, the curvature of the flexible display panel increases.

5. The apparatus as claimed in claim 3, wherein the first slider is slidably engaged with a side part of the first cover, and the second slider is slidably engaged with a side part of the second cover.

6. The apparatus as claimed in claim 5, wherein the first slider comprises a first guide and a second guide, which are configured to be guided to an upper end of the first cover and a lower end of the first cover, respectively,
wherein the second slider comprises a third guide and a fourth guide, which are configured to be guided to an upper end of the second cover and a lower end of the second cover, respectively.

7. The apparatus as claimed in claim 5, further comprising:
a first lock configured to fix a sliding position of the first slider; and
a second lock configured to fix a sliding position of the second slider.

8. The apparatus as claimed in claim 7, wherein the first lock comprises at least one locking protrusion configured to be disposed on one of the first slider and the first cover and at least one locking groove configured to be disposed on the other of the first slider and the first cover,
wherein the second lock comprises at least one locking protrusion configured to be disposed on one of the second slider and the second cover, and at least one locking groove configured to be formed on the other of the second slider and the second cover.

9. The apparatus as claimed in claim 1, wherein the first cover comprises a first supporter and the second cover comprises a second supporter, and the first supporter and the second supporter are configured to support a fold of the flexible display panel.

10. The apparatus as claimed in claim 9, wherein in response to the first cover and the second cover being folded, the first cover and the second cover have an escape groove for the first supporter and the second supporter to escape inside the first cover and the second cover, respectively, such that the fold of the flexible display panel maintains the curvature.

11. An electronic apparatus comprising:
a flexible display panel;
a first cover, a second cover, and a third cover, each configured to support a rear surface of the flexible display panel; and
a first slider and a second slider configured to be slidably engaged with an end portion of each of the first cover and the second cover, respectively, which are located in an outer region,
wherein the first slider and the second slider are configured to vary a curvature of the flexible display panel by sliding along the first cover and the second cover, respectively, and
wherein the curvature of the flexible display panel is varied according to the sliding of the first slider and the second slider while an angle between the first cover and the third cover is maintained and an angle between the second cover and the third cover is maintained.

12. The apparatus as claimed in claim 11, wherein the first cover, the second cover, and the third cover are connected by a plurality of hinge members.

13. The apparatus as claimed in claim 12, wherein the first cover, the second cover, and the third cover comprise a plurality of supporters configured to correspond to each of the plurality of hinge members to support a fold of the flexible display panel.

14. The apparatus as claimed in claim 13, wherein in response to the first cover, the second cover, and the third cover being folded, the first cover, the second cover, and the third cover have an escape groove for the plurality of supporters to escape inside the first cover, the second cover, and the third cover, respectively, such that the fold of the flexible display panel maintains the curvature.

15. The apparatus as claimed in claim 11, wherein the first slider is connected to a first side of the flexible display and the second slider is connected to a second side of the flexible display panel, and each of the first slider and the second slider is configured to slide in a first direction of approaching an adjacent cover and in a second direction of receding from the adjacent cover, respectively.

16. The apparatus as claimed in claim 15, wherein in response to at least one of the first slider and the second slider being moved in the first direction, the curvature of the flexible display panel decreases, and in response to at least one of the first slider or the second slider being moved in the second direction, the curvature of the flexible display panel increases.

17. The apparatus as claimed in claim 15, wherein the first slider comprises a first guide and a second guide, which are configured to be guided to an upper end of the first cover and a lower end of the first cover, respectively,
wherein the second slider comprises a third guide and a fourth guide, which are configured to be guided to an upper end of the second cover and a lower end of the second cover, respectively.

18. The apparatus as claimed in claim 15, further comprising:
a first lock configured to fix a sliding position of the first slider; and
a second lock configured to fix a sliding position of the second slider.

19. The apparatus as claimed in claim 18, wherein the first lock comprises at least one locking protrusion configured to be disposed on one of the first slider and the first cover and at least one locking groove configured to be disposed on the other of the first slider and the first cover,
wherein the second lock comprises at least one locking protrusion configured to be disposed on one of the second slider and the second cover and at least one locking groove configured to be formed on the other of the second slider and the second cover.

20. The apparatus as claimed in claim 11, wherein in response to the curvature of the flexible display panel reaching a predetermined curvature, the flexible display panel displays a User Interface (UI) corresponding to the predetermined curvature.

21. The apparatus as claimed in claim 11, wherein in response to a Graphical User Interface (GUI) displayed in the flexible display panel being selected, the flexible display panel has a predetermined curvature to execute an application corresponding to the GUI by sliding along the first cover and the second cover and output an execution screen of the application corresponding to the GUI.

22. The apparatus as claimed in claim 21, wherein in response to the first cover and the second cover being folded, the flexible display panel has a surface in which a part protrudes outside, and the protruded part displays a User Interface (UI).

\* \* \* \* \*